(12) United States Patent
Ikizyan et al.

(10) Patent No.: US 10,200,697 B2
(45) Date of Patent: Feb. 5, 2019

(54) DISPLAY STREAM COMPRESSION PIXEL FORMAT EXTENSIONS USING SUBPIXEL PACKING

(71) Applicant: QUALCOMM Incorporated, San Diego, CA (US)

(72) Inventors: Ike Ikizyan, San Diego, CA (US); Natan Haim Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 15/203,721

(22) Filed: Jul. 6, 2016

(65) Prior Publication Data

US 2017/0013266 A1    Jan. 12, 2017

Related U.S. Application Data

(60) Provisional application No. 62/190,689, filed on Jul. 9, 2015.

(51) Int. Cl.
*H04N 19/182* (2014.01)
*H04N 19/146* (2014.01)
(Continued)

(52) U.S. Cl.
CPC ............. *H04N 19/182* (2014.11); *H04N 9/64* (2013.01); *H04N 19/115* (2014.11);
(Continued)

(58) Field of Classification Search
CPC ... G09G 2300/0452; G09G 2340/0457; G09G 2340/0407; G09G 2320/0276; G09G 5/02;
(Continued)

(56) References Cited

U.S. PATENT DOCUMENTS

2007/0159492 A1    7/2007 Lo et al.
2007/0206852 A1    9/2007 McGee et al.
(Continued)

FOREIGN PATENT DOCUMENTS

WO    WO-2007004194 A2    1/2007
WO    WO-2015139629 A1    9/2015

OTHER PUBLICATIONS

Walls et al. (VESA Display Stream Compression, Mar. 3, 2014) (Year: 2014).*
(Continued)

*Primary Examiner* — Anand S Rao
*Assistant Examiner* — Samuel D Fereja
(74) *Attorney, Agent, or Firm* — Shumaker & Sieffert, P.A.

(57) ABSTRACT

Methods and apparatuses for display stream compression pixel format extension using subpixel packing are disclosed. In one aspect, the method involves packing pixel values arranged in an O-channel format for encoding by an M-channel codec. The method may further involve receiving a set of input pixel values, each input pixel value including O input subpixel values arranged in the O-channel format. The method may involve rearranging each of the input subpixel values into a set of output pixel values, each set of output pixel values comprising M output subpixel values arranged in an M-channel format, O having a greater value than M, wherein at least a portion of the rearranged M output subpixels maintain their relative spatial positioning from prior to being rearranged from the O input subpixel values. The method may also involve providing the output pixel values to the M-channel codec.

22 Claims, 16 Drawing Sheets

(51) Int. Cl.
*H04N 19/115* (2014.01)
*H04N 19/186* (2014.01)
*H04N 19/85* (2014.01)
*H04N 19/423* (2014.01)
*H04N 9/64* (2006.01)

(52) U.S. Cl.
CPC ......... *H04N 19/146* (2014.11); *H04N 19/186* (2014.11); *H04N 19/423* (2014.11); *H04N 19/85* (2014.11)

(58) Field of Classification Search
CPC ......... G09G 3/2003; G09G 2340/0414; G09G 2340/0421; G09G 2340/0492; G09G 5/006; G09G 3/20; G09G 5/005; G09G 3/3607; G09G 2340/06; G09G 2310/0235; G09G 2320/0666; G09G 3/2044; G09G 3/3413; G09G 3/342; G09G 2310/024; G09G 2320/041; G09G 2360/144; G09G 2360/145; G09G 2360/18; G09G 2360/16; G09G 2300/0443; G09G 2320/0646; G09G 2330/021; G09G 2340/10; G09G 3/3426; G09G 5/024; G09G 5/026; G09G 5/14; G09G 5/24; G09G 5/28; G09G 2300/023; G09G 2320/062; G09G 2320/106; G09G 2360/142; G09G 3/2096; G09G 3/3433; G09G 5/20; G09G 5/363; G09G 2300/0439; G09G 2340/02; G09G 2340/0435; G09G 2350/00; G09G 3/007; G09G 5/391; G09G 5/393; G09G 5/395; H04N 19/523; H04N 19/80; H04N 19/186; H04N 19/59; H04N 19/61; H04N 19/46; H04N 7/0125; H04N 9/3155; H04N 19/85; H04N 5/7416; H04N 9/312; H04N 9/64; H04N 19/117
See application file for complete search history.

(56) References Cited

U.S. PATENT DOCUMENTS

| | | |
|---|---|---|
| 2007/0247477 A1 | 10/2007 | Lowry et al. |
| 2009/0052772 A1 | 2/2009 | Speirs et al. |
| 2011/0149166 A1 | 6/2011 | Botzas et al. |
| 2012/0281150 A1 | 11/2012 | Glen et al. |
| 2013/0308057 A1 | 11/2013 | Lu et al. |
| 2014/0247983 A1 | 9/2014 | MacInnis et al. |
| 2014/0294089 A1* | 10/2014 | MacInnis ............... H04N 19/63 375/240.19 |
| 2016/0127771 A1 | 5/2016 | Pasqualino et al. |
| 2017/0025093 A1* | 1/2017 | Ju ........................... H04N 19/00 |

OTHER PUBLICATIONS

International Search Report and Written Opinion—PCT/US2016/041287—ISA/EPO—dated Sep. 15, 2016.

TU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Written Opinion dated Sep. 15, 2016, from International Application No. PCT/US2016/041287, filed on Nov. 29, 2016, 9 pp.

International Preliminary Report on Patentability from International Application No. PCT/US2016/041287, dated Sep. 27, 2017, 5 pp.

* cited by examiner

RGBW Input Sequence (rate x)

| $R_0$ | $R_1$ | $R_2$ | $R_3$ | $R_4$ | $R_5$ |
| $G_0$ | $G_1$ | $G_2$ | $G_3$ | $G_4$ | $G_5$ |
| $B_0$ | $B_1$ | $B_2$ | $B_3$ | $B_4$ | $B_5$ |
| $W_0$ | $W_1$ | $W_2$ | $W_3$ | $W_4$ | $W_5$ |

• • •  400

Packing Scheme (rate 4x/3)

| $R_0$ | $W_0$ | $B_1$ | $G_2$ | $R_3$ | $W_3$ | $B_4$ | $G_5$ |
| $G_0$ | $R_1$ | $W_1$ | $B_2$ | $G_3$ | $R_4$ | $W_4$ | $B_5$ |
| $B_0$ | $G_1$ | $R_2$ | $W_2$ | $B_3$ | $G_4$ | $R_5$ | $W_5$ |

• • •  410

Above Data as Interpreted by DSC which assumes RGB input format

| $R_0$ | $R_1$ | $R_2$ | $R_3$ | $R_4$ | $R_5$ | $R_6$ | $R_7$ |
| $G_0$ | $G_1$ | $G_2$ | $G_3$ | $G_4$ | $G_5$ | $G_6$ | $G_7$ |
| $B_0$ | $B_1$ | $B_2$ | $B_3$ | $B_4$ | $B_5$ | $B_6$ | $B_7$ |

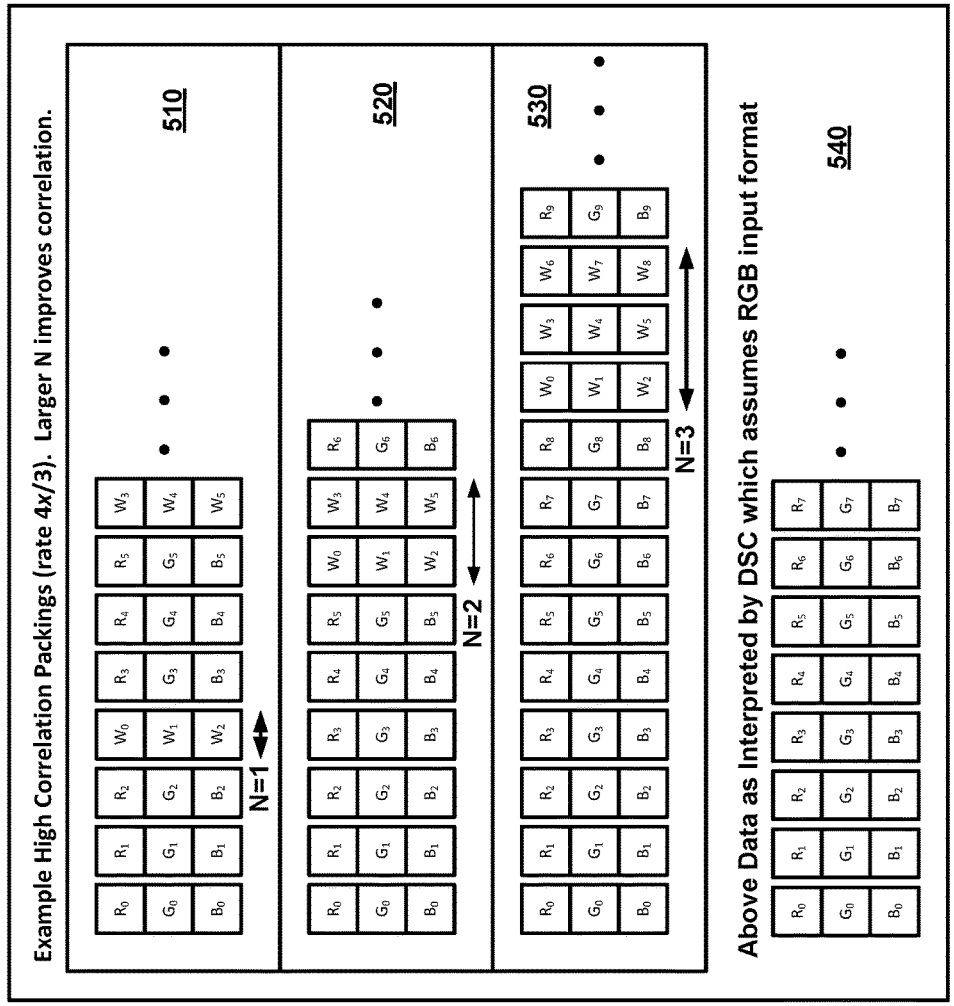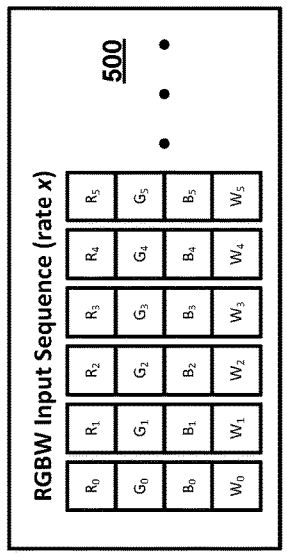
FIG. 6

| Image | Description |
|---|---|
| A | Zone plate test pattern (mixture of colored/grayscale quadrants) |
| B | Photograph of woman holding roses behind table with fruit and place settings with color chart on gray wall |
| C | Gray gradient ramp test pattern |
| D | Intro screen capture of popular mobile game |
| E | Screen capture of mobile map application with dense map |
| F | Test pattern split in four quadrants including zone plate pattern, screen capture of search engine application, and two colorful synthetic test patterns |

FIG. 11

| Image | Resolution (RGBW) | Method 1 (PSNR) | Method 2 (N=27) (PSNR) | Method 3 (N=27) (PSNR) | Method 4 (N=27) (PSNR) | Delta M2 – M1 (PSNR) |
|---|---|---|---|---|---|---|
| A | 832x400 | 27.69 | 33.97 | 33.25 | 33.58 | 6.28 |
| B | 832x400 | 38.94 | 41.78 | 41.65 | 41.62 | 2.84 |
| C | 832x400 | 50.33 | 68.18 | 68.75 | 71.79 | 17.85 |
| D | 704x810 | 39.95 | 45.10 | 44.96 | 44.83 | 5.15 |
| E | 832x960 | 34.96 | 38.59 | 38.63 | 38.51 | 3.63 |
| F | 1696x800 | 36.07 | 44.95 | 44.49 | 44.60 | 8.88 |

FIG. 12

DISPLAY STREAM COMPRESSION PIXEL FORMAT EXTENSIONS USING SUBPIXEL PACKING

INCORPORATION BY REFERENCE TO PRIORITY APPLICATION(S)

This application claims the benefit of U.S. Provisional Application No. 62/190,689, filed Jul. 9, 2015, which is incorporated by reference in its entirety.

TECHNICAL FIELD

This disclosure relates to the field of video coding and compression, and particularly, to video compression for transmission over display links, such as display stream compression.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed Display Stream Compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, there is provided a method of packing pixel values arranged in an O-channel format for encoding by an M-channel codec. The method may involve receiving a set of input pixel values, each input pixel value comprising O input subpixel values arranged in the O-channel format; rearranging each of the input subpixel values into a set of output pixel values, each set of output pixel values comprising M output subpixel values arranged in an M-channel format, O having a greater value than M, wherein at least a portion of the rearranged M output subpixels maintain their relative spatial positioning from prior to being rearranged from the O input subpixel values; and providing the output pixel values to the M-channel codec.

In another aspect, there is provided a device for packing pixel values arranged in an O-channel format for encoding by an M-channel codec. The device may include a transceiver circuit comprising O input channels configured to respectively receive O input subpixel values of an input pixel value arranged in the O-channel format; at least one buffer configured to buffer the O input subpixels; and a logic circuit configured to rearrange the O input subpixels into a set of output pixel values, each output pixel value comprising M output subpixel values arranged in an M-channel format, O having a greater value than M, wherein at least a portion of the rearranged M output subpixels maintain their relative spatial positioning from prior to being rearranged from the O input subpixel values; wherein the transceiver circuit further comprises M output channels configured to output the set of output pixel values to the M-channel codec.

In yet another aspect, there is provided a method of unpacking pixel values arranged in an M-channel format. The method may involve receiving a set of input pixel values from an M-channel codec, each input pixel comprising M input subpixel arranged in the M-channel format; rearranging each of the input subpixel values into a set of output pixel values, each set of output pixel values comprising O output subpixel values arranged in an O-channel format, O having a greater value than M, wherein at least a portion of the rearranged O output subpixels maintain their relative spatial positioning from prior to being rearranged from the M input subpixel values; and providing the output pixel values as an output.

In still another aspect, there is provided a device for unpacking pixel values arranged in an M-channel format. The device may include a transceiver circuit comprising M input channels configured to respectively receive M input subpixel values of an input pixel value arranged in the M-channel format; at least one buffer configured to buffer the M input subpixels; and a logic circuit configured to rearrange the M input subpixels into a set of output pixel values, each output pixel value comprising O output subpixel values arranged in an O-channel format, O having a greater value than M, wherein at least a portion of the rearranged O output subpixels maintain their relative spatial positioning from prior to being rearranged from the M input subpixel values; wherein the transceiver circuit further comprises O output channels configured to output the set of output pixel values.

BRIEF DESCRIPTION OF THE DRAWINGS

FIGS. 5-8 are diagrams illustrating example pixel packing schemes in accordance with aspects described in this disclosure.

FIG. 11 is a table describing the test images for quality evaluation.

FIG. 12 is a table with the picture quality results based on the pixel packing techniques described in this disclosure.

DETAILED DESCRIPTION

Figure 1A:
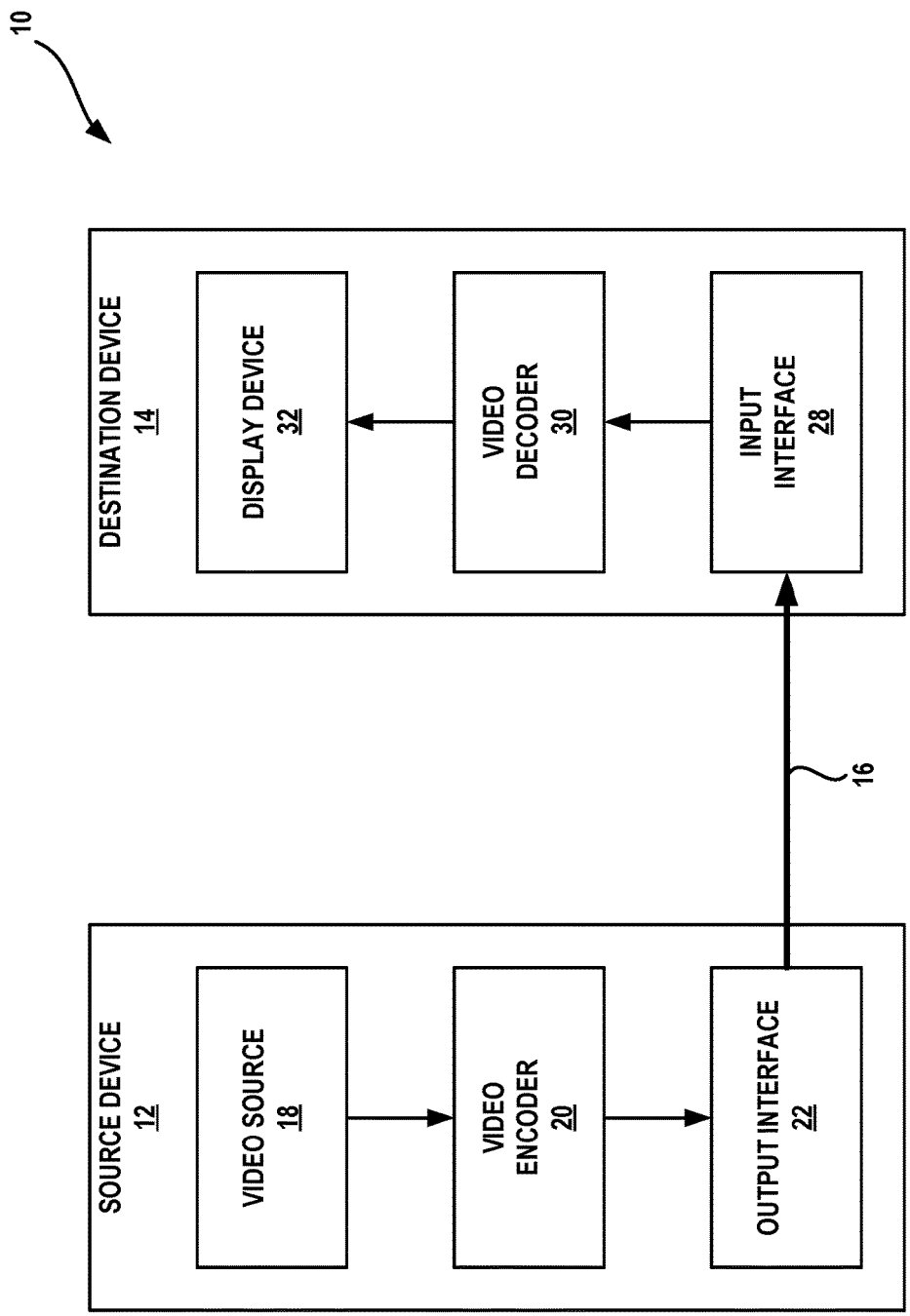
FIG. 1A is a block diagram illustrating an example video encoding and decoding system that may utilize techniques in accordance with aspects described in this disclosure.

In general, this disclosure relates to techniques for supporting additional color spaces that represent brightness, luminance or luma, and color via traditional or legacy coding techniques. Video compression techniques, such as, for example, Display Stream Compression (DSC) may support Red, Green, and Blue (RGB) or YCbCr input formats which are suited for typical existing displays. However, certain displays introduce additional subpixels, for example, a fourth subpixel (e.g., White (W)) in order to achieve higher power efficiency for a given brightness. Special processing may be needed to convert from a first input format (e.g. RGB) to a second input format (e.g., RGBW) format. For example, such a conversion may be performed by a display driver, such as a display driver integrated circuit (DDIC). However, it may be desirable to support such a conversion process via a system on chip (SoC) in order to lower the system cost. This means the SoC may need generate RGBW information for transmission across the display link. Since existing approaches to DSC do not currently support RGBW, there remains a need for a compression solution for such a scenario.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intraframe compression, but does not include inter-frame compression, meaning that temporal information may not be used by the DSC standard in coding the video data. In contrast, other video coding standards may employ interframe compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
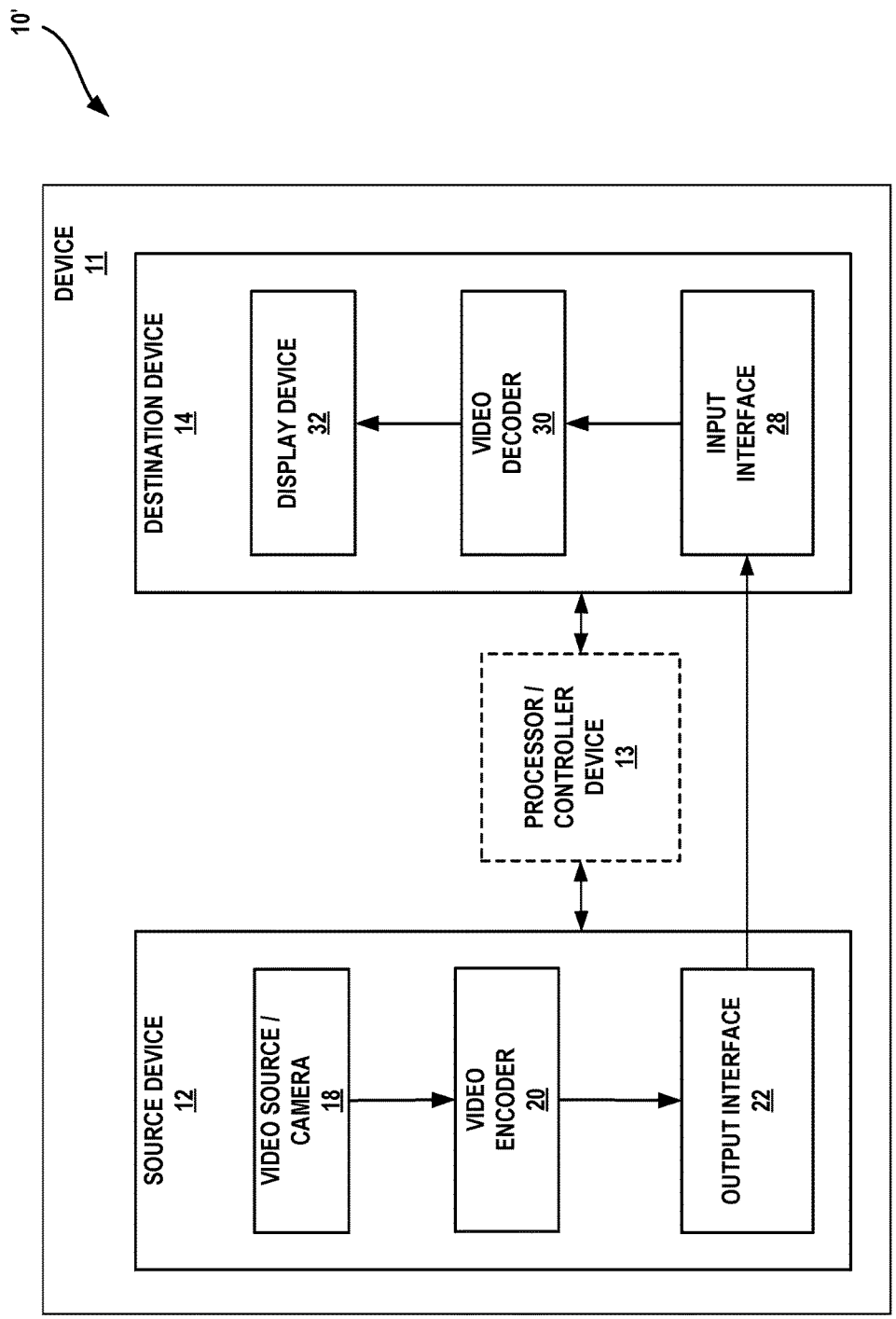
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

Example Video Encoder

Figure 2A:
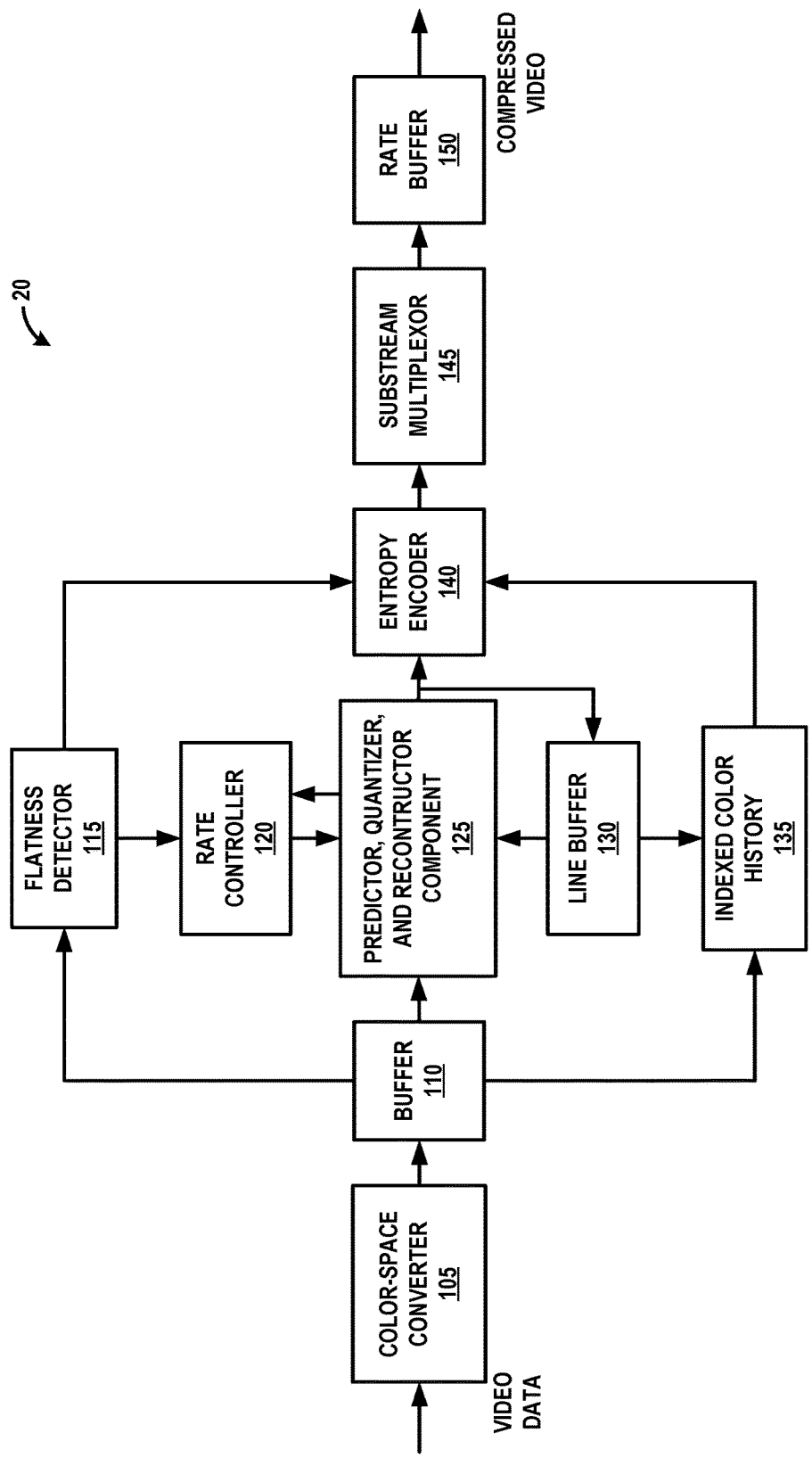
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCoCg) color-space. The color-space conversion may be performed by method(s) including shifts and additions to the video data. It is noted that input video data in other color-spaces may be processed and conversions to other color-spaces may also be performed.

Certain codecs may not be designed to perform conversions between all color-space standards. For example, certain color-spaces, such as red, green, blue, and white (RGBW), may include 4 color channels, which is greater than the more common 3-channel color formats listed above. Advances in display technology may employ additional subpixels, e.g., RGBW, creating demand for this color format. However, legacy 3-channel codecs have only 3 inputs/outputs, and thus are not natively configured to receive 4 channel input. Therefore, these 3-channel codecs cannot code RGBW video data without modification to the internal structure and specification of the 3-channel standard.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

Example Video Decoder

Figure 2B:
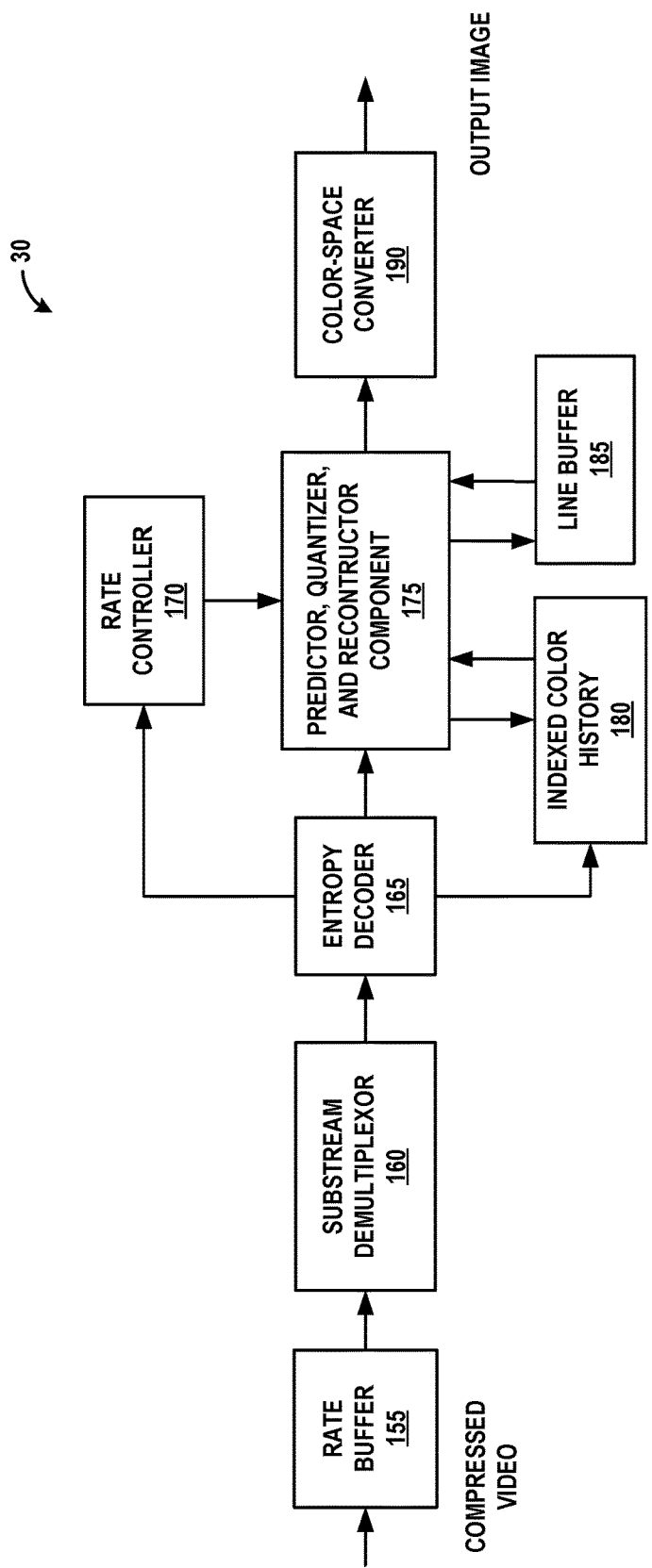
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant.

Quantization Parameter (QP)

As described above, video coding may include the quantization of the video data via, for example, the predictor, quantizer, and reconstructor component 125. Quantization may introduce loss into a signal and the amount of loss can be controlled by the QP determined by the rate controller 120. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

Further Example of Video Encoder

Figure 3:
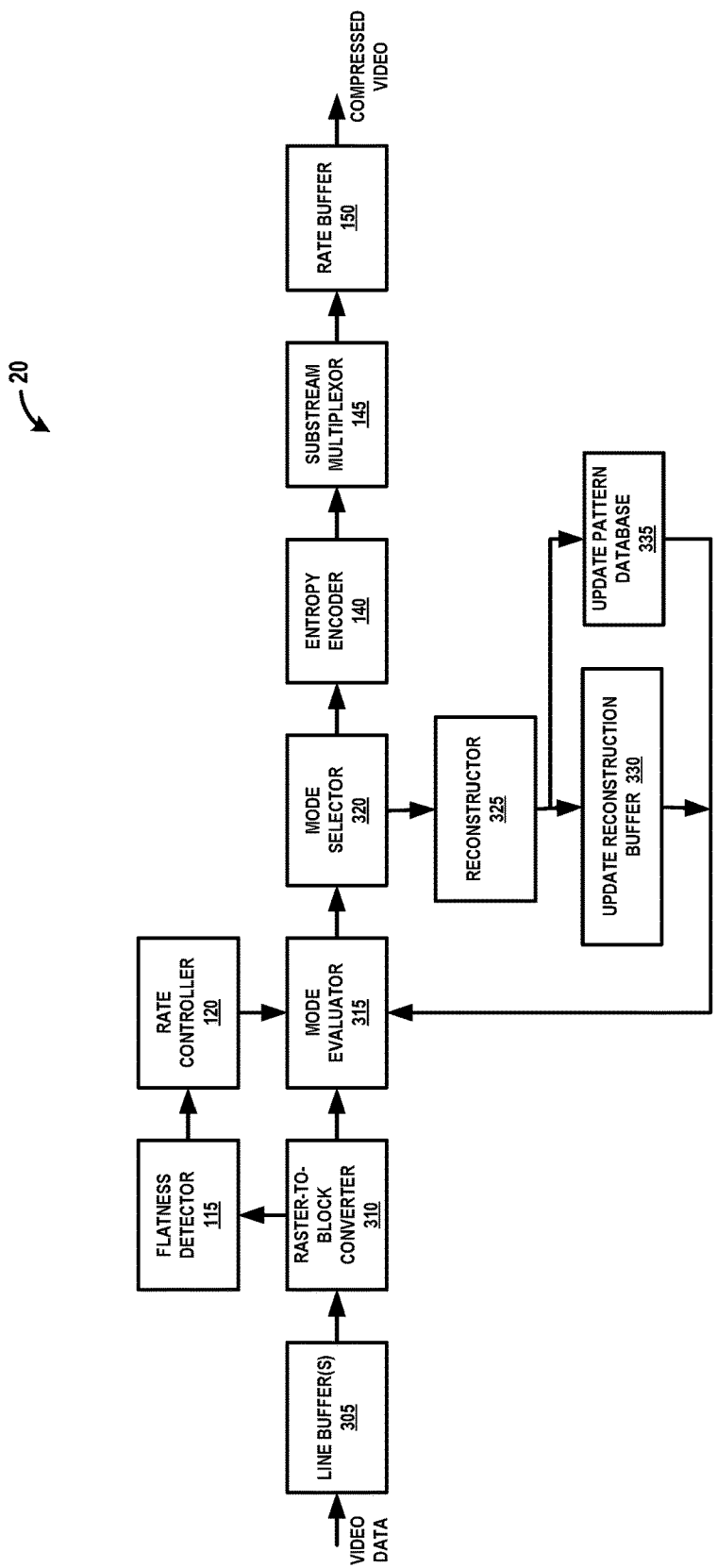
FIG. 3 is a block diagram illustrating another example of a video encoder that may implement techniques in accordance with aspects described in this disclosure.

FIG. 3 is a block diagram illustrating another example of a video encoder 20 with which to implement techniques in accordance with aspects described herein. The video encoder 20, or component(s) thereof, may be configured to perform some or all of the techniques of this disclosure. In some examples, the techniques described herein may be shared or distributed among the various components of the video encoder 20. In some examples, additionally or alternatively, a processor (not shown) may be configured to perform some or all of the techniques described herein.

In the example of FIG. 3, the video encoder 20 includes a plurality of functional components. The functional components of the video encoder 20 may include, for example, a flatness detector 115, a rate controller 120, an entropy encoder 140, a substream multiplexor 145, a rate buffer, 150, line buffer(s) 305, a raster-to-block converter 310, a mode evaluator 315, a mode selector 320, a reconstructor 325, an update reconstruction buffer component 330, and an update pattern database component 335. In other examples, the video encoder 20 may include more, fewer, or different functional components. The flatness detector 115, the rate controller 120, the entropy encoder 140, the substream multiplexor 145, and rate buffer 150 may function similarly to the corresponding components of the video encoder 20 described above in connection with FIG. 2A, and thus, a further detailed discussion of these components will not be repeated.

The line buffer(s) 305 may be a buffer or a plurality of buffers which store, for example, 2-4 lines of video data. The lines of video data stored by the line buffer(s) 305 may be provided to the raster-to-block converter 310. The number of lines stored by the line buffer(s) 305 may correspond to the number of rows of pixels used to create a block of pixels (e.g., Kx2 or Kx4 blocks). The raster-to-block converter may 310 convert the lines of video data into blocks of video data on which the encoder 20 is designed to operate.

The raster-to-block converter 310 may be configured to provide the blocks to the flatness detector 115 and/or the mode evaluator 315. The flatness detector 115 detects flat areas in the video data, and may operate in a manner similar to the flatness detector 115 of FIG. 2A. Similarly, the rate controller 120, which receives output from the flatness detector 115, may operate in a manner similar to the rate controller 120 of FIG. 2A.

The mode evaluator 315 may be configured to evaluate one or more parameters associated with the coding of the blocks received from the raster-to-block converter 310 in a plurality of coding modes. For example, the mode evaluator 315 may determine a rate-distortion cost for encoding a current block for each of the plurality of coding modes. Examples of the coding modes may include a transform coding mode (e.g., DCT, Hadamard, etc.), a block prediction coding mode, a differential pulse-code modulation (DPCM) coding mode, a pattern coding mode, a mid-point prediction (MPP) coding mode, and an MPP fall back (MPPF) coding mode. The mode selector 320 may select one of the plurality of coding modes for encoding the current block of the video data. In one implementation, the mode selector 320 may be configured to select the coding mode having the lowest rate-distortion cost as determined by the mode evaluator 315. The output of the mode selector 320 may be provided to the reconstructor 325 and/or the entropy encoder 140. Each of the entropy encoder 140, the substream multiplexor, 145 and the rate buffer 150 may operate similarly to the corresponding components of the example encoder described in connection with FIG. 2A.

Similar to the predictor, quantizer, and reconstructor component 125 of the encoder of FIG. 2A, the reconstructor 325 may perform reconstruction of the originally received video data which may include adding an inverse quantized residual to a predicted value and ensuring that the result does not fall outside of an allowed or valid range of sample values. The update reconstruction buffer 330 may be configured to store information related to the reconstruction of the video data from the reconstructor 325. For example, the update reconstruction buffer 330 may store reconstructed pixel values in the same lines as the current block and the previous reconstructed line. In certain implementations, these reconstructed pixel values may be used for prediction in certain coding modes.

The update pattern database 335 may be configured to store pixel values which repeatedly or commonly appear in the video data. These stored pixel values may be used by certain coding modes, such as coding modes which reference an index (e.g., pattern coding mode). The use of one or more indices in the updated pattern database 335 to refer to the stored pixel values may improve rate-distortion for certain content types, such as graphics content, where large regions may include a small set of distinct pixel values.

Although not described or illustrated in detail, those skilled in the art will recognize that a corresponding video decoder may be constructed based on the video encoder 20 illustrated in FIG. 3. Such a video decoder may be configured to decode the encoded video bitstream to reproduce visually lossless images corresponding to the video data received by the video encoder 20.

While certain embodiments of the video encoder and/or video decoder are described herein in the context of the DSC standard, one having ordinary skill in the art would appreciate that systems and methods disclosed herein may be applicable to any suitable video coder or coding standard.

It is noted that the video encoder 20, the video decoder 30, and/or component(s) thereof illustrated in FIGS. 1A-1B, FIGS. 2A-2B, and/or FIG. 3, may be configured to perform one or more of the features of the coding techniques described herein.

The video encoder, the video decoder, and/or component(s) thereof may be implemented on a device that includes an integrated global memory shared by a plurality of programmable compute units that includes a buffer, wherein the buffer may include a first-in-first-out (FIFO) buffer. The device may further include an integrated circuit (IC) that may include at least one processor or processor circuit (e.g., a central processing unit (CPU)) and/or a graphics processing unit (GPU), wherein the GPU may include one or more programmable compute units. The device may be part of a SoC, wherein the SoC that may include a CPU that uses at least one reduced instruction set computing (RISC) instruction set. The SoC may include multiple CPU cores and GPUs.

Pixel Format Extensions Using Subpixel Packing

In accordance with one or more aspects of the present disclosure, provided are technique(s) for subpixel packing that allows DSC to support new pixel formats, such as, for example, RGBW. The present disclosure extends the usefulness of DSC beyond RGB and YCbCr based formats, and provides a technique that allows DSC to operate on four or more primary colors (e.g., RGBW) while retaining the high levels of picture quality associated with the DSC standard. This may be accomplished by adding a custom pre-processing step at the input of an encoder and a corresponding post-processing step after a decoder. The encoder and decoder themselves do not need any modification.

Figure 4:
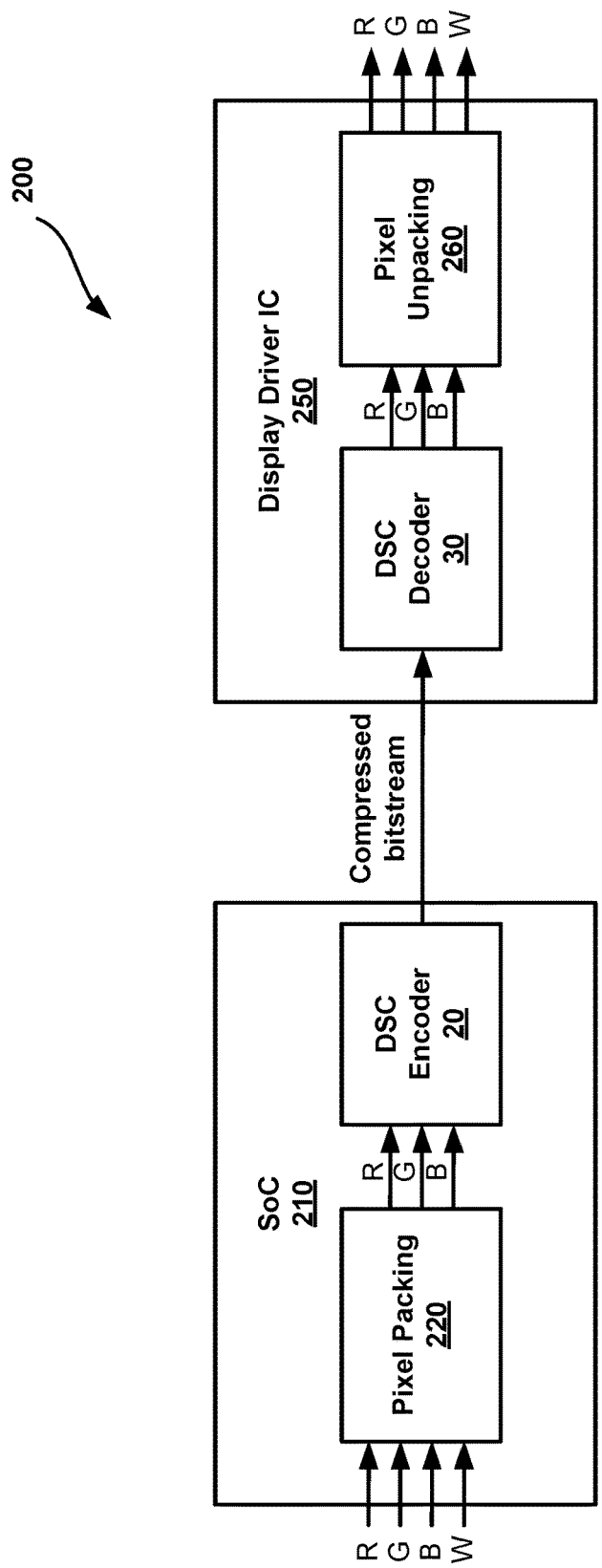
FIG. 4 is a block diagram of an example system for pixel packing/unpacking.

With reference to the example of FIG. 4, there is shown a block diagram of a system 200 for subpixel packing/unpacking that allows the DSC standard to support new pixel formats beyond RGB and YCbCr, such as pixel formats with four or more primary colors. An example of a pixel format that supports four or more primary colors is RGBW. For illustrative purposes, the subpixel packing of RGBW is used to illustrate aspects of the present disclosure; however, it will be understood that the techniques described herein are applicable to other pixel formats beyond RGBW, RGB and YCbCr.

The example of system 200 may include a SoC 210 and a display driver integrated circuit (IC) 250 that are in communication with each other. The SoC 210 transmits a compressed stream of data to the display driver IC 250.

The SoC 210 may include a pixel packing unit 220 that receives four or more subpixel values (e.g., RGBW), packs the four or more subpixel values, and outputs a smaller number (e.g., three) of subpixel values (e.g., RGB). The number of subpixel values in a given format may be referred to hereinafter as a number of channels (which may also be referred to as a number of substreams). The SoC 210 may include a DSC encoder 20 that receives the three subpixel values from the pixel packing unit 220. For example, the DSC encoder 20 may comprise the encoder 20 of FIG. 2A or FIG. 3. The packing of the four or more subpixel values into the smaller number of pixel values may format the four or more subpixel values into a format that is acceptable as input to the DSC encoder 20.

The display driver IC 250 may include a DSC decoder 30 that receives a compressed stream of data from the DSC encoder 20. The display driver IC 250 may include a pixel unpacking unit 260 that receives three subpixel values (e.g., RGB) from the DSC decoder 30 and unpacks the three subpixel values into four or more subpixel values (e.g., RGBW). The number of channels of the unpacked subpixel values may correspond to the number of channels received by the pixel packing unit 220.

The packing of four subpixel values into three subpixel values at the SoC 210, as well as the corresponding unpacking of three subpixel values into four subpixel values at the display driver IC 250, are shown and described herein for illustrative purposes. It is noted that the subpixel packing techniques may be used for any suitable number of subpixel values. Additionally, the number of subpixel values may or may not correspond to the number of subpixels used by a given display device.

With reference to FIG. 5, there is shown an example approach to pixel packing. The RGBW input sequence 400 of rate x is shown on the left hand side of FIG. 5. The packing scheme with correlation properties (at the rate of 4x/3) as applied to the data 410 is shown on the upper right hand side. Specifically, the packing scheme on the upper right of FIG. 5 merely packs the RGBW data into RGB channels without changing the order of the data (e.g., from top to bottom, left to right). The data 410 is interpreted by the DSC codec (e.g., the DSC encoder 20 or the DSC decoder 30 of FIG. 4), which assumes an RGB input format, as data 420, as shown on the lower right hand side of FIG. 5. It is noted that the packing scheme of FIG. 5 may have suboptimal correlation properties, which may lead to less than optimal compressed image quality due to reduced data correlation. For example, the DSC codec may interpret the pixel value $R_1$ as a red pixel, and apply encoding/decoding techniques based on this assumption. However, according to the packing technique of FIG. 5, this pixel is packed with the pixel value $W_0$. Thus, if the DSC encoder were to attempt to encode the pixel value $W_0$ on the assumption that it should have a certain correlation with the pixel value $R_0$, the encoder may not realize efficiencies that would otherwise occur if this assumption were true.

With reference to FIG. 6, there is shown another example approach to pixel packing. The RGBW input sequence 500 of rate x is shown on the left hand side of FIG. 6. It is noted that the packing schemes of FIG. 6 are designed to preserve spatial correlation for high picture quality compression. The white (W) subpixels in FIG. 6 are arranged in column-major order.

One packing scheme which maintains correlation properties (rate 4x/3) as applied to the data 510 is shown on the upper right hand side of FIG. 6, where N=1. It is noted that larger N values may improve correlation. The packing scheme which maintains correlation properties (rate 4x/3) as applied to the data 520 where N=2 is also shown on the right hand side of FIG. 6. The packing scheme which maintains correlation properties (rate 4x/3) as applied to the data 530 where N=3 is also shown on the right hand side of FIG. 6. The data 510 (N=1), the data 520 (N=2), or the data 530 (N=3) may be interpreted by the DSC codec, which assumes RGB input format, as data 540, as shown on the lower right hand side of FIG. 5. It is noted that N can be any integer value, and that N is not limited to the N values (e.g., N=1, 2, or 3) used herein for illustrative purposes.

In the packing scheme of FIG. 6, the DSC coder interprets the white pixel values $W_0$ to $W_8$ as RGB pixel values. However, due to the arrangement of the white pixel values $W_0$ to $W_8$ within the packing scheme of FIG. 6, less spatial correlation between pixel values is lost than in the pixel packing scheme of FIG. 5. For example, in the N=1 packing scheme, the relative spatial positions of the pixel values $R_0$ to $R_2$, $G_0$ to $G_2$, and $B_0$ to $B_2$ remains unchanged. Thus, the spatial correlation for these pixel values remains until the pixel values $W_0$ to $W_2$ are placed in the output pixel values. As can be seen in the N=2 and N=3 packing scheme, even further spatial correlation is maintained due to the arrangement of the pixel values $W_0$ to $W_8$. Additionally, there may be more correlation between the white pixel values $W_0$ to $W_8$, which may be arranged together, than between the white pixel values $W_0$ to $W_8$. and pixel values of other color channels.

With further reference to FIG. 6, those skilled in the art will recognize that the illustrated pixel packing scheme maintains at least some of the relative spatial positioning (e.g., the spatial arrangement) of the pixels from the input sequence in each of the output sequences 510, 520, 530. For example, the first three pixel values including the subpixel values $R_0$ to $R_2$, $G_0$ to $G_2$, and $B_0$ to $B_2$ have the same spatial arrangement in the output sequence 510 as in the input sequence 500. The spatial arrangement of the white pixels $W_0$ to $W_2$ is altered in the output sequence 510, however, the spatial positioning of at least the subpixel values $R_0$ to $R_2$, $G_0$ to $G_2$, and $B_0$ to $B_2$ is substantially maintained. Further, in the packing schemes 520 and 530 which have higher N values, a larger number of input subpixels are maintained in the same relative spatial positioning.

Figure 7:
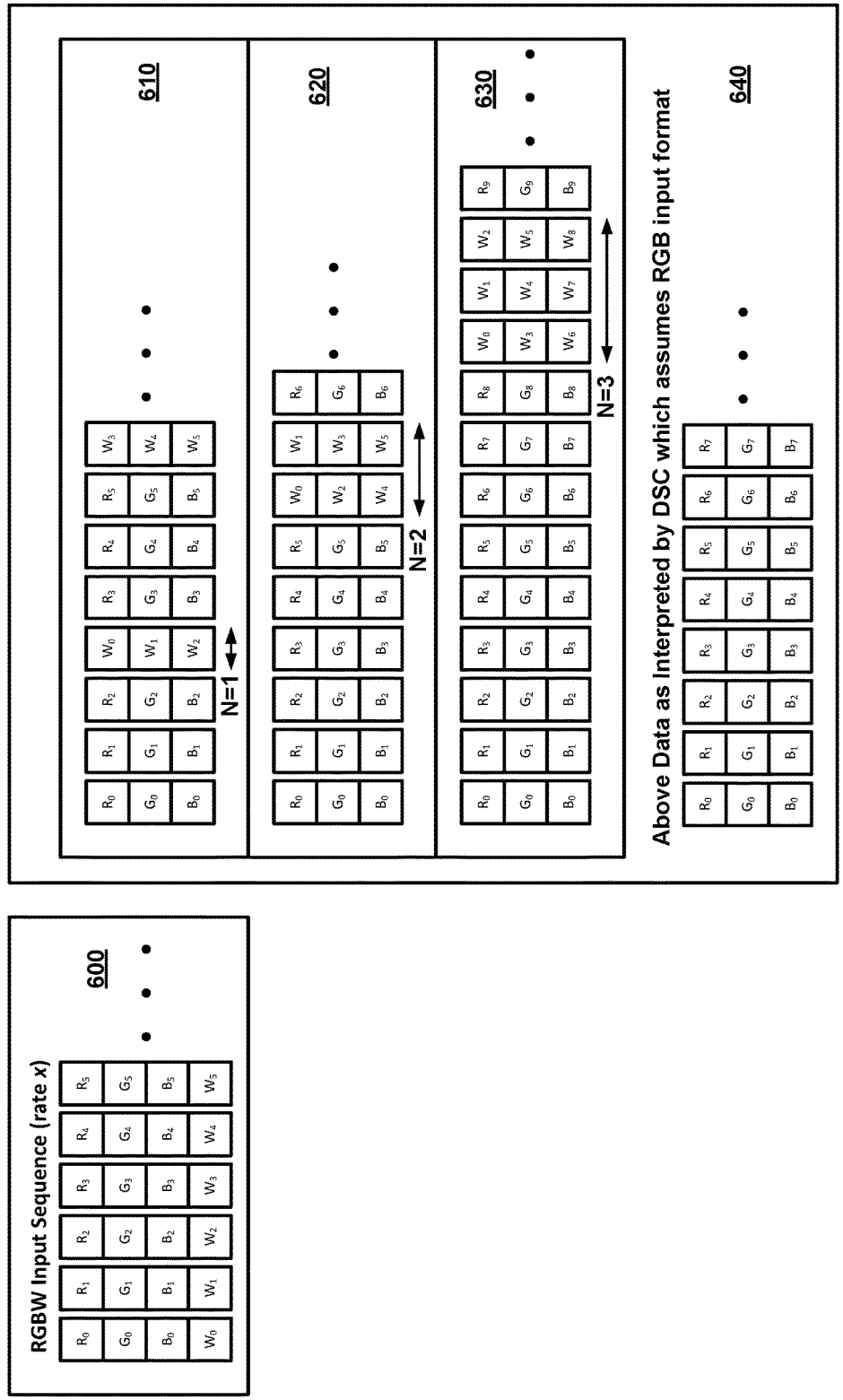

With reference to FIG. 7, there is shown yet another example approach to pixel packing. The RGBW input sequence 600 of rate x is shown on the left hand side of FIG. 7. It is noted that the packing schemes of FIG. 7, similar to those of FIG. 6, are designed to preserve spatial correlation for high picture quality compression. However, the W subpixels in FIG. 7 are arranged in row-major order rather than in column-major order. Depending on the content of the video data to be encoded, the arrangement of the W subpixels in row-major order or column-major order may have an effect on the efficiency of the DSC encoder 20.

The packing scheme which maintains correlation properties (rate 4x/3) as applied to the data 610 is shown on the upper right hand side of FIG. 7, where N=1. As in the embodiment of FIG. 6, it is noted that larger N values may improve correlation. The packing scheme which maintains correlation properties (rate 4x/3) as applied to the data 620 where N=2 is also shown on the right hand side of FIG. 7. The packing scheme which maintains correlation properties (rate 4x/3) as applied to the data 630 where N=3 is also shown on the right hand side of FIG. 7. The data 610 (N=1), the data 620 (N=2), or the data 630 (N=3) may be interpreted by the DSC codec, which assumes RGB input format, as data 640, as shown on the lower right hand side of FIG. 7.

Figure 8:
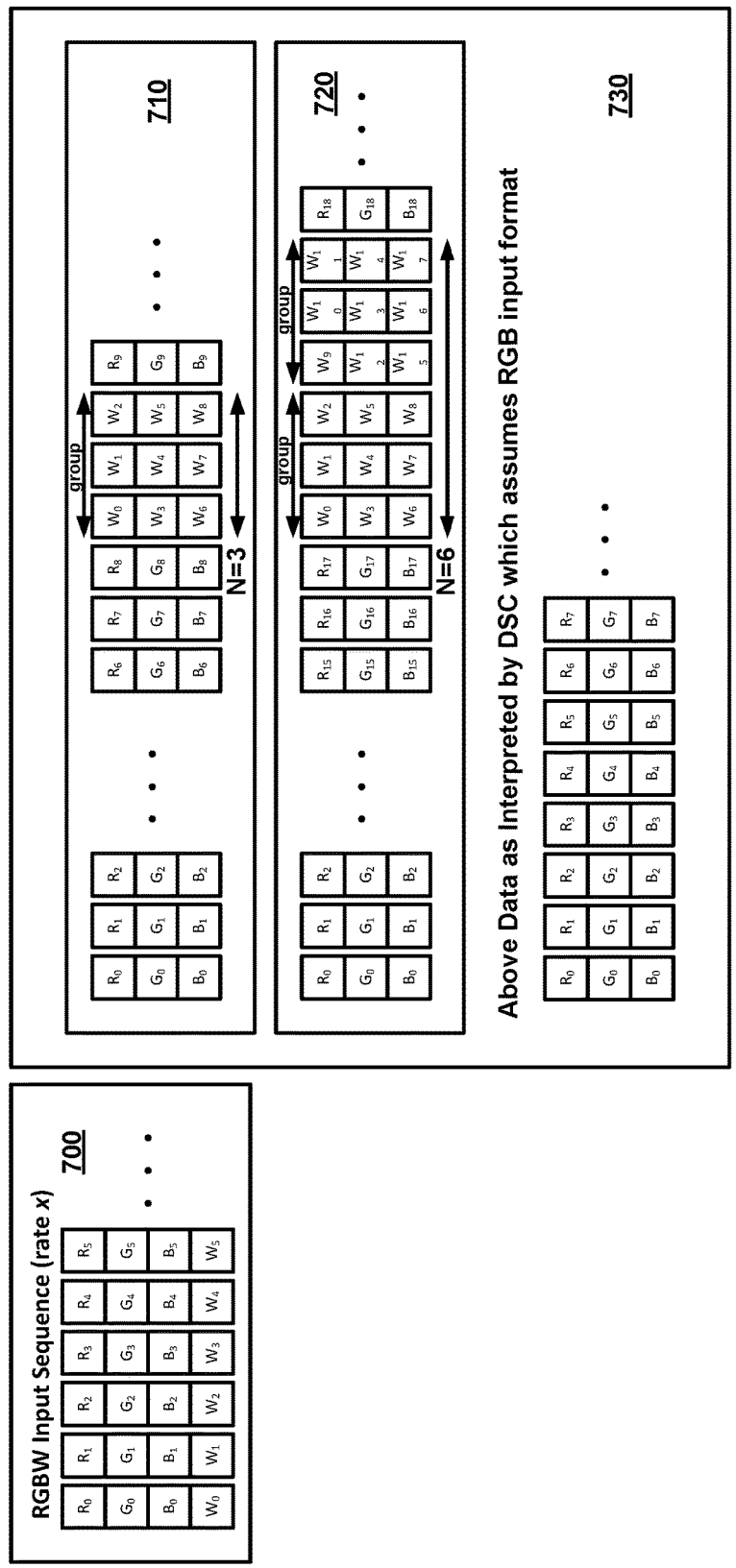

With reference to FIG. 8, there is shown yet another example approach to pixel packing. The RGBW input sequence 700 of rate x is shown on the left hand side of FIG. 8. It is noted that the packing schemes of FIG. 8, similar to those of FIG. 6 and FIG. 7, are designed to preserve spatial correlation for high picture quality compression. However, the W subpixels shown in FIG. 8 are arranged ordered in groups of 3×3 in row-major order. N is a multiple of three in this example.

The packing scheme which maintains correlation properties as applied to the data 710 is shown on the upper right hand side of FIG. 8, where N=3. Once again, it is noted that larger N values may improve correlation. The packing scheme which maintains correlation properties as applied to the data 720 where N=6 is also shown on the right hand side of FIG. 8. The data 710 (N=3) and the data 720 (N=6) may be interpreted by the DSC codec, which assumes RGB input format, as data 730, as shown on the lower right hand side of FIG. 8.

The use of multiples of three for the packing scheme may lead to certain efficiencies that other values of N do not obtain. For example, the DSC coder is a 3-channel coder, and thus, by formatting the input data into groups having relative spatial positioning that is divided into groups of 3 (e.g., grouping W subpixels together where N is a multiple of 3), the DSC coded may be able to take advantage of the assumptions used in designing the codec. In general, it may be beneficial to have the value of N be a multiple of the number of color channels used by the codec.

Figure 9:
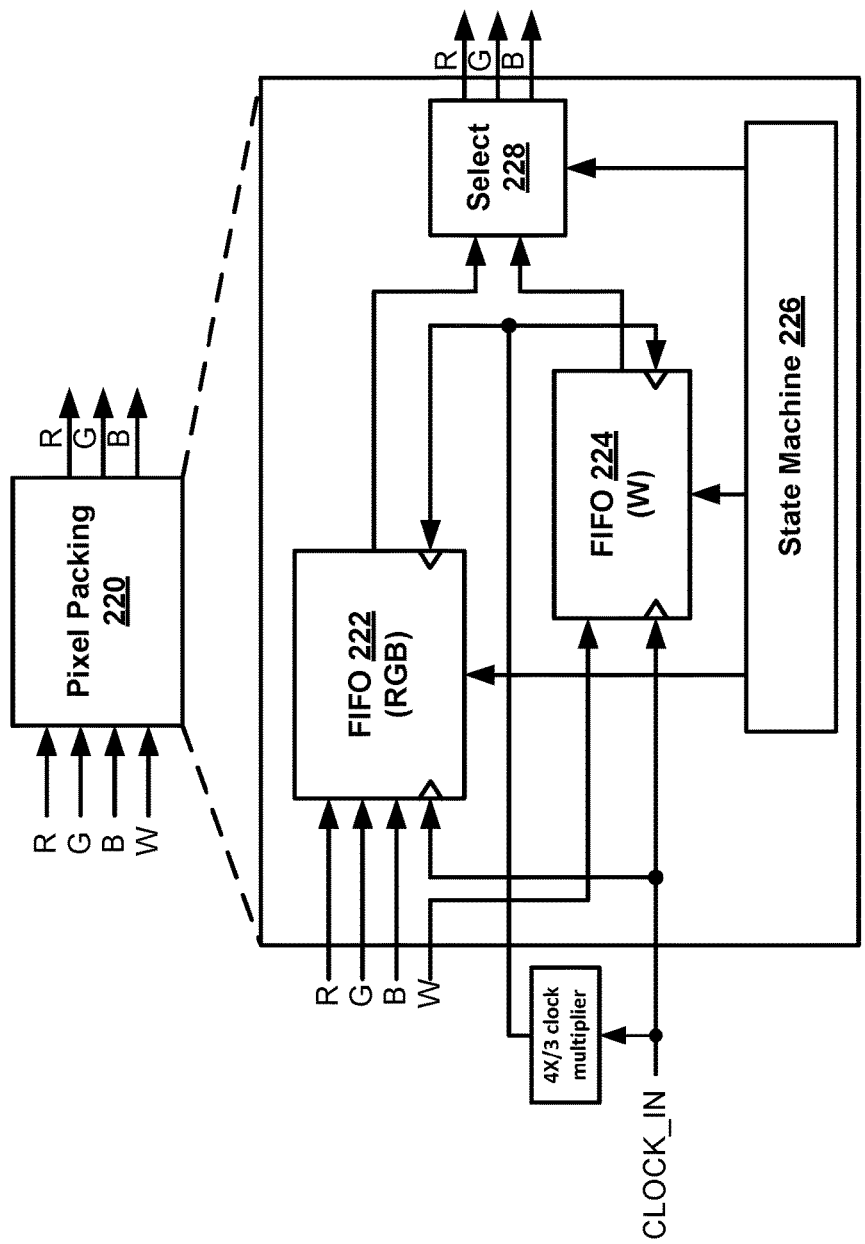
FIG. 9 is a diagram illustrating an example architecture for pixel packing in accordance with aspects described in this disclosure.

With reference to FIG. 9, there is shown an example architecture for pixel packing. For example, there is shown a pixel packing unit 220 that receives four or more subpixel values (e.g., RGBW), packs the four or more subpixel values, and outputs a smaller number (e.g., three) of subpixel values (e.g., RGB). For illustrative purposes, the present example corresponds to the example technique of FIG. 6 and is for the operation of RGBW to RGB pixel packing for 6 RGBW samples (N=2). 6 RGBW samples will become 6·(4/3)=8 RGB samples. The input clock for RGBW samples is scaled up by a 4/3 ratio for output clock. If t is the period of one cycle for the input clock, then the period of one cycle for the output clock is 3t/4.

The pixel packing unit 220 may include two or more FIFO buffers. For example, the pixel packing unit 220 may include a FIFO buffer 222 and a FIFO buffer 224, as well as a state machine 226 and a selector unit 228, arranged as shown in FIG. 9. The FIFO buffer 222 may be configured to store RGB subpixel values. The FIFO buffer 224 may be configured to store W subpixels. The storage requirements of the FIFO buffer 222 and the FIFO buffer 224 depends on the value of N and the packing technique (e.g., the example techniques of FIGS. 6-8).

Each of the FIFO buffer 222 and the FIFO buffer 224 receives a clock input and a 4X/3 clock multiplier input, and is configured to receive an input from the state machine 226.

The selector unit 228 receives input from both the FIFO buffer 222 and the FIFO buffer 224.

Is noted that the corresponding architecture for the pixel unpacking unit 260 is substantially similar to that of the pixel packing unit 220, but performs the inverse function such that the input to the pixel unpacking unit 260 may include RGB subpixel values, whereas the output may include RGBW subpixel values.

Figure 10:
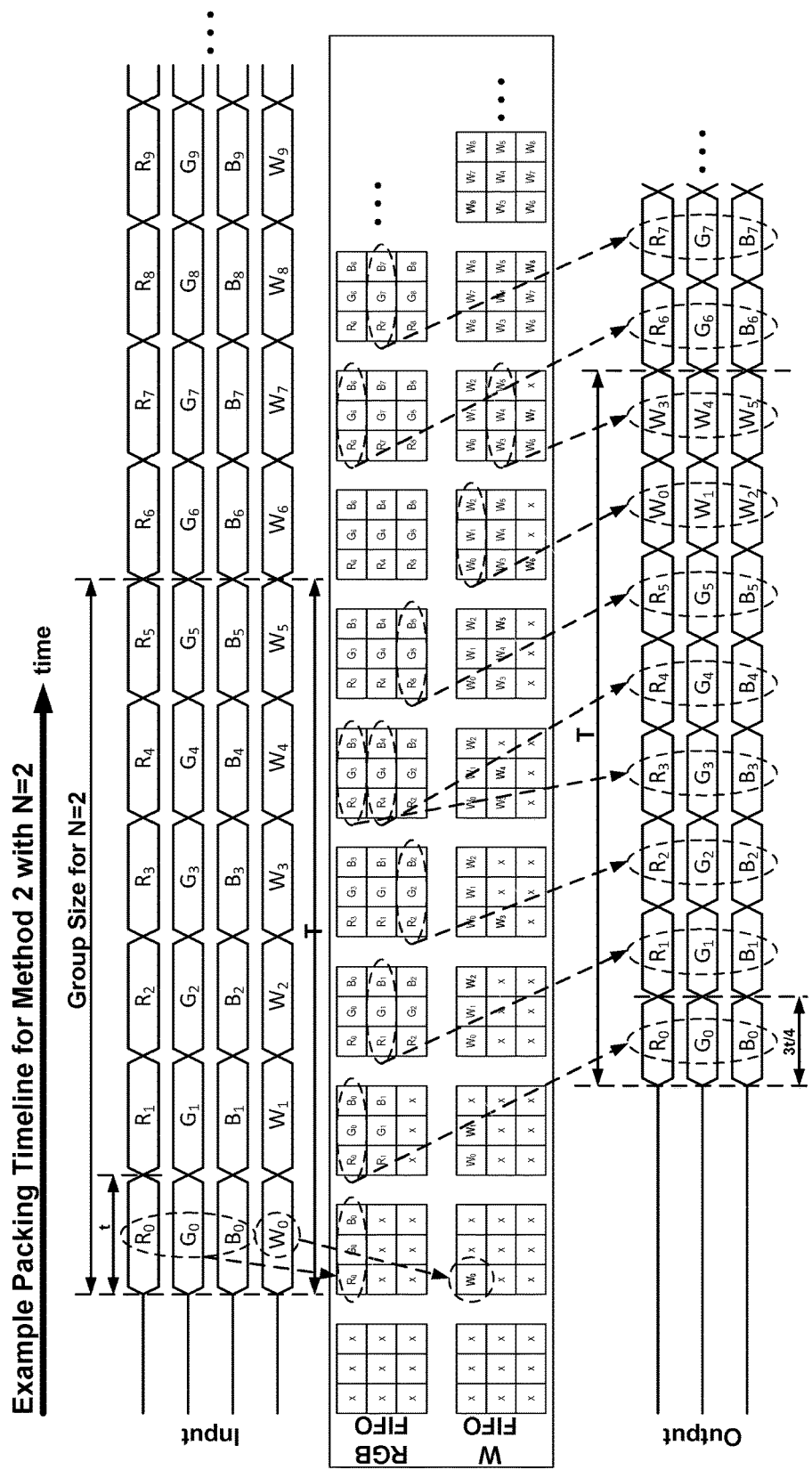
FIG. 10 is an example packing timeline in accordance with aspects described in this disclosure.

A timing diagram corresponding to the implementation of the example technique of FIG. 6 with the example architecture of FIG. 9 is shown in FIG. 10. As such, operation of the example architecture of FIG. 9 will be described in more detail in connection with the timing diagram of FIG. 10. For example, if t is the period of one cycle for the input clock and if N=2, then during a first cycle of the input clock, the subpixel values $R_0$ $G_0$ $B_0$ may be stored in the FIFO buffer 222, while subpixel $W_0$ may be stored in the FIFO buffer 222 as shown. At a second cycle of the input clock, subpixel values $R_1$ $G_1$ $B_1$ may also be stored in the FIFO buffer 222, while subpixel $W_1$ may be stored in the FIFO buffer 222 as shown. At a third cycle of the input block, the subpixel values $R_2$ $G_2$ $B_2$ may also be stored in the FIFO buffer 222, while subpixel $W_2$ may be stored in the FIFO buffer 224 as shown. At a fourth cycle of the input block, the subpixel values $R_0$ $G_0$ $B_0$ are removed from the FIFO buffer 222, while subpixel $W_0$ is removed from the FIFO buffer 224, to make room for other subpixel values (e.g., subpixel values $R_3$ $G_3$ $B_3$ $W_3$, etc.). In other embodiments, the oldest subpixel values (e.g., $R_0$ $G_0$ $B_0$ $W_0$) are simply overwritten when the FIFO buffers 222 and 224 are full.

At a first cycle of the output clock (3t/4), which overlaps with the second and third cycles of the input clock, the subpixel values $R_0$ $G_0$ $B_0$ are output by the pixel packing unit 220 (e.g., via the selector unit 228). During the second cycle of the output clock, the subpixel values $R_1$ $G_1$ $B_1$ are output by the pixel packing unit 220. The pixel packing unit 220 outputs the subpixel values $R_2$ $G_2$ $B_2$, and $R_3$ $G_3$ $B_3$, and $R_4$ $G_4$ $B_4$, and $R_5$ $G_5$ $B_5$, in a similar manner during the second through sixth cycles of the output clock. During the output of the RGB subpixel values having subscript values between 0 and 5, the state machine 226 may select the FIFO 222 for output to the selector unit 228.

The pixel packing unit 220 outputs the subpixel values $W_0$ $W_1$ $W_2$ during the seventh cycle of the output clock, and outputs pixel values $W_3$ $W_4$ $W_5$ during the eighth cycle of the output clock. During the seventh and eighth cycles, the state machine 226 may select the FIFO 224 for output to the selector unit 228.

It is noted that the example timing diagram in FIG. 10 is for illustrative purposes only, and that the different parameters relating to the input/output subpixel values, the input/output clocks, arrangement of the W subpixel values, etc. may be implemented that result in different timing packing/unpacking solutions with different timing diagrams.

It is further noted that there are several advantages to the subpixel packing/unpacking techniques and architecture described herein. One advantage is the pre/post processors are low cost, e.g., including only very small subpixel re-ordering units compared to other color-space conversion techniques. Such pre/post processors are involve some buffering, which is a small fraction of the size of a typical line buffer, and thus cost-effective. Another advantage is that the compression results exhibit high picture quality in terms of subjective and perceptual metrics. Yet another advantage is that no modifications to the DSC encoder/decoder are needed, such that disclosed techniques are DSC standards compliant. Still another advantage is that the disclosed techniques may be applied to other color formats beyond RGBW, allowing the DSC standard to be extended to additional applications.

Test images for quality evaluation are described in a table in FIG. 11, and the corresponding picture quality results are provided in a table in FIG. 12. Method 2 corresponds to the method of FIG. 6, method 3 corresponds to the method of FIG. 7, and method 4 corresponds to the method of FIG. 8. Method 2, 3, and 4 demonstrate significant performance improvement with respect to the basic method of FIG. 5. The PNSR values in FIG. 12 are based on computations in the RGBW color space. As is clear from the PNSR values of FIG. 12, the method that provides the greatest picture quality results may vary depending on the spatial correlation of the test images. Thus, under certain circumstances, one of the pixel packing schemes may produce better results than the other schemes.

Figure 13:
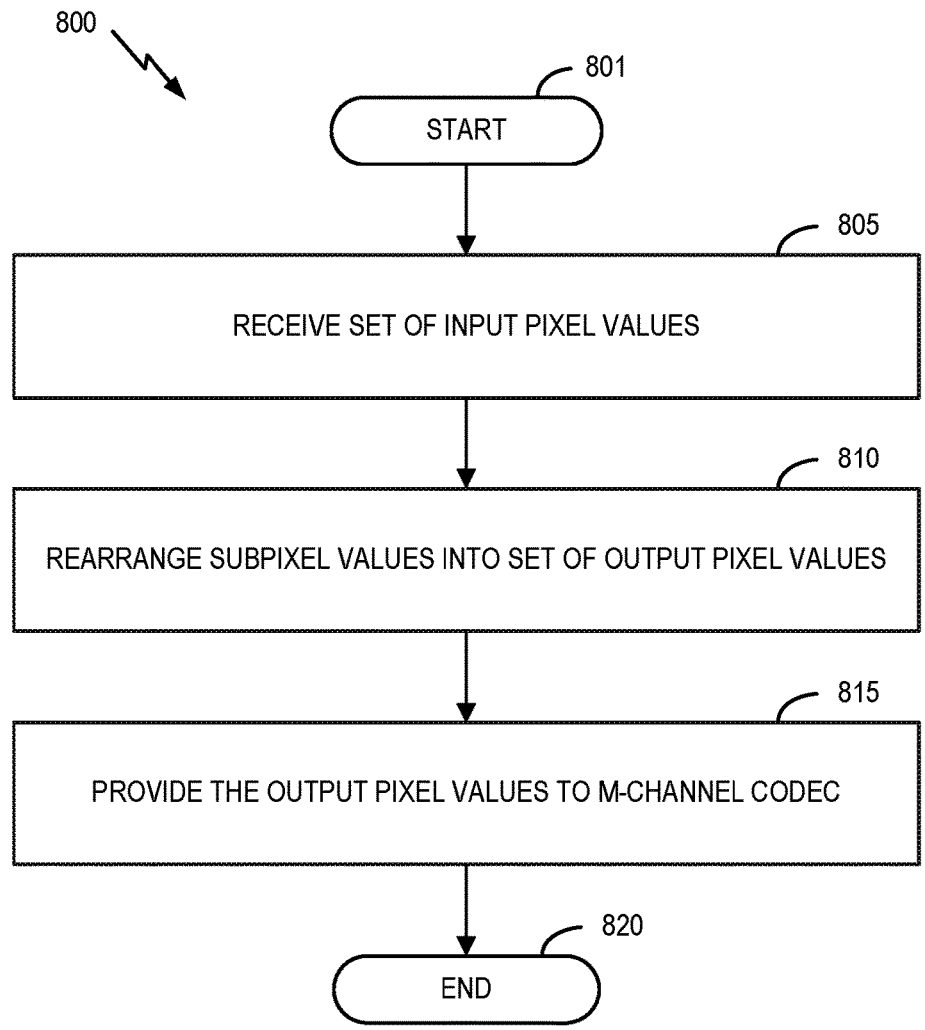
FIG. 13 is a flowchart illustrating a method for pixel packing in accordance with aspects described in this disclosure.

Example Flowchart for Packing Pixel Values Arranged in a First Format into a Second Format With reference to FIG. 13, an example procedure for packing pixel values arranged in a first format into a second format will be described. FIG. 13 is a flowchart illustrating a method 800 for coding video data, according to an embodiment of the present disclosure. The steps illustrated in FIG. 13 may be performed by a video encoder (e.g., the video encoder 20 in FIG. 2A or FIG. 3) or component(s) thereof. For convenience, method 800 is described as performed by a video coder (also simply referred to as coder), which may be the video encoder 20 or another component.

The method 800 begins at block 801. At block 805, the coder receives a set of input pixel values. The input pixel values are arranged in a first format (e.g., an O-channel format). Each input pixel value may include O input subpixel values. At block 810, the coder rearranges the input subpixel values into a set of output pixel values. Each set of output pixel values may include M output subpixel values arranged in an M-channel format. In certain implementations, O may have a greater value than M. After the rearrangement, at least a portion of the rearranged M output subpixels maintain their relative spatial positioning from prior to being rearranged from the O input subpixel values.

At block 815, the coder provides the output pixel values to an M-channel codec. Due to the rearrangement of the input pixel values into the M-channel format, the M-channel coded may be able to code the rearranged output pixel values. Further, since the M-channel codec may code the received pixel values based on certain assumed spatial relationships between the received pixel values, the rearranged M output subpixels may achieve certain coding efficiencies based on their maintained relative spatial positioning. The method 800 ends at block 820.

In the method 800, one or more of the blocks shown in FIG. 13 may be removed (e.g., not performed) and/or the order in which the method is performed may be switched. In some embodiments, additional blocks may be added to the method 800. The embodiments of the present disclosure are not limited to or by the example shown in FIG. 13, and other variations may be implemented without departing from the spirit of this disclosure.

Figure 14:
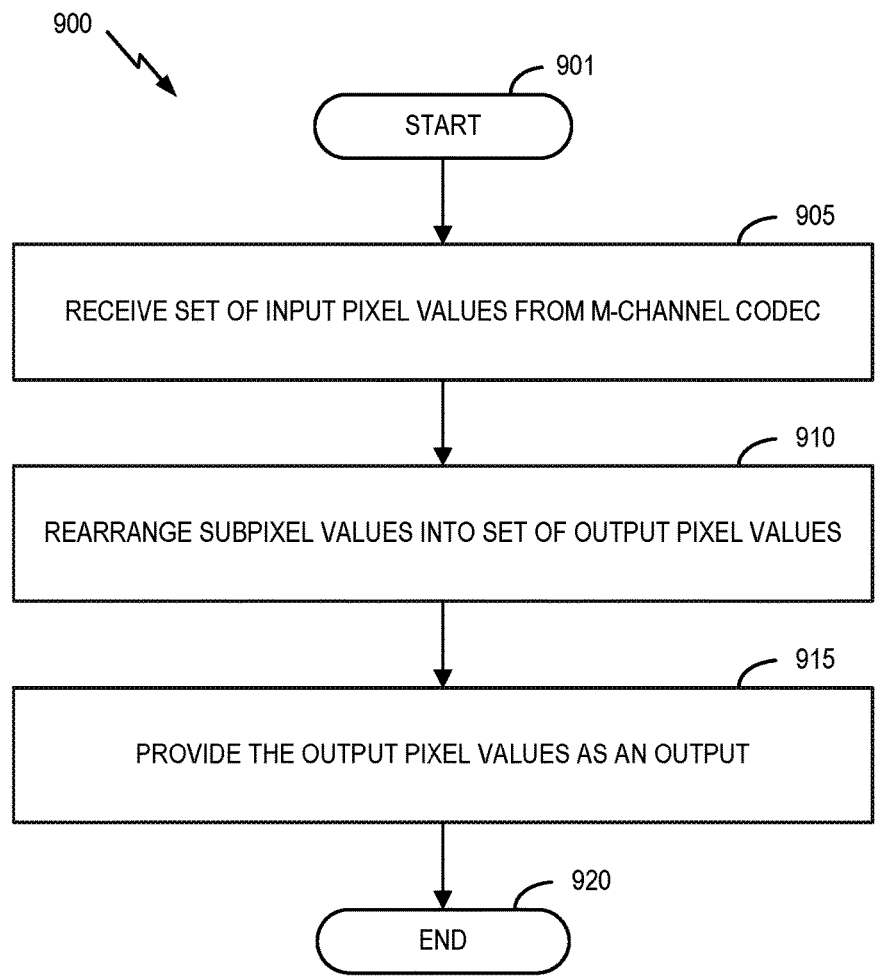
FIG. 14 is a flowchart illustrating a method for pixel unpacking in accordance with aspects described in this disclosure.

Example Flowchart for Unpacking Pixel Values Arranged in a First Format into a Second Format With reference to FIG. 14, an example procedure for packing pixel values arranged in a first format into a second format will be described. FIG. 14 is a flowchart illustrating a method 900 for coding video data, according to an embodiment of the present disclosure. The steps illustrated in FIG. 14 may be performed by a video decoder (e.g., the video encoder 30 in FIG. 2B) or component(s) thereof. For convenience, method 900 is described as performed by a video coder (also simply referred to as coder), which may be the video decoder 30 or another component.

The method 900 begins at block 901. At block 905, the coder receives a set of input pixel values from an M-channel codec. The input pixel values are arranged in a first format (e.g., an M-channel format). Each input pixel value may include M input subpixel values. At block 910, the coder rearranges the input subpixel values into a set of output pixel values. Each set of output pixel values may include O output subpixel values arranged in an O-channel format. In certain implementations, O may have a greater value than M. After the rearrangement, at least a portion of the rearranged O output subpixels maintain their relative spatial positioning from prior to being rearranged from the M input subpixel values.

At block 915, the coder provides the output pixel values as an output. For example, the output pixel values may be provided to a display for display to a user. The display may be an O-channel display, for example, a display having a plurality of pixel, each pixel have O subpixel (e.g., a RGBW display). Due to the rearrangement of the input pixel values into the O-channel format, the display may be able to display the rearranged output pixel values without including a full color-space converter. The method 900 ends at block 920.

In the method 900, one or more of the blocks shown in FIG. 14 may be removed (e.g., not performed) and/or the order in which the method is performed may be switched. In some embodiments, additional blocks may be added to the method 900. The embodiments of the present disclosure are not limited to or by the example shown in FIG. 14, and other variations may be implemented without departing from the spirit of this disclosure.

Other Considerations

It should be noted that aspects of this disclosure have been described from the perspective of an encoder, such as the pixel packing unit 220 in FIG. 9. However, those skilled in the art will appreciate that the reverse operations to those described above may be applied to decode the generated bitstream by, for example, the pixel unpacking unit 260 in FIG. 4.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute instructions of program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method of packing pixel values arranged in an O-channel format for encoding by an M-channel codec, comprising:
    receiving a set of input pixel values, each input pixel value comprising O input subpixel values arranged in the O-channel format;
    rearranging each of the input subpixel values into a set of output pixel values, each set of output pixel values comprising M output subpixel values arranged in an M-channel format, O having a greater value than M, wherein at least a portion of the rearranged M output subpixels maintain their relative spatial positioning from prior to being rearranged from the O input subpixel values, wherein the M-channel format includes M different color channels and wherein the O-channel format includes the M color channels and at least one additional color channel, and wherein rearranging each of the input subpixel values into a set of output pixel values comprises:
        arranging each of the input subpixel values of the M color channels in the corresponding M color channels of the output pixel values,
        arranging each of the input subpixel values of the at least one additional color channel into output pixel values including only the at least one additional color channel,
        buffering each of the input subpixel values of the M color channels in a first buffer,
        buffering each of the input subpixel values of the at least one additional color channel in a second buffer,
        selecting pixels from the first buffer to construct the output pixel values, and
        after the second buffer contains a sufficient number of subpixel values to construct N output pixel values, selecting pixels from the second buffer to construct the N output pixel values including only the at least one additional color channel, the N output pixel values being directly adjacent to each other; and
    providing the output pixel values to the M-channel codec.

2. The method of claim 1, wherein the first and second buffers are first in first out (FIFO) buffers.

3. The method of claim 1, wherein the subpixels of the at least one additional color channel are arranged in column-major order in the N output pixel values.

4. The method of claim 1, wherein the subpixels of the at least one additional color channel are arranged in row-major order in the N output pixel values.

5. The method of claim 1, further comprising:
    selecting, via a state machine, which of the first and second buffers from which to receive subpixels for constructing the output pixel values.

6. The method of claim 1, further comprising:
    providing the output pixel values to the M-channel codec at a rate that is greater than the rate at which the set of input pixel values are received.

7. A device for packing pixel values arranged in an O-channel format for encoding by an M-channel codec, comprising:
    a transceiver circuit comprising O input channels configured to respectively receive O input subpixel values of an input pixel value arranged in the O-channel format;
    at least one buffer configured to buffer the O input subpixels; and
    a logic circuit configured to rearrange the O input subpixels into a set of output pixel values, each output pixel value comprising M output subpixel values arranged in an M-channel format, O having a greater value than M, wherein at least a portion of the rearranged M output subpixels maintain their relative spatial positioning from prior to being rearranged from the O input subpixel values, wherein the M-channel format includes M different color channels and wherein the O-channel format includes the M color channels and at least one additional color channel, and wherein to rearrange each of the input subpixel values into a set of output pixel values, the logic circuit is further configured to:
        arrange each of the input subpixel values of the M color channels in the corresponding M color channels of the output pixel values,
        arrange each of the input subpixel values of the at least one additional color channel into output pixel values including only the at least one additional color channel,
        buffer each of the input subpixel values of the M color channels in a first buffer of the at least one buffer,
        buffer each of the input subpixel values of the at least one additional color channel in a second buffer of the at least one buffer,
        select pixels from the first buffer to construct the output pixel values, and
        after the second buffer contains a sufficient number of subpixel values to construct N output pixel values, select pixels from the second buffer to construct the N output pixel values including only the at least one additional color channel, the N output pixel values being directly adjacent to each other,
    wherein the transceiver circuit further comprises M output channels configured to output the set of output pixel values to the M channel codec.

8. The device of claim 7, wherein the first and second buffers are first in first out (FIFO) buffers.

9. The device of claim 7, wherein the logic circuit is further configured to arrange the subpixels of the at least one additional color channel are in column-major order.

10. The device of claim 7, wherein the logic circuit is further configured to arranged the subpixels of the at least one additional color channel are in row-major order.

11. The device of claim 7, wherein the logic circuit comprises a state machine and wherein the state machine is configured to select which of the first and second buffers from which to receive subpixels for constructing the output pixel values.

12. The device of claim 7, wherein the M output channels are further configured to output the set of output pixel values to the M-channel codec at a rate that is greater than the rate at which the set of input pixel values are received by the O input channels.

13. A method of unpacking pixel values arranged in an M-channel format, comprising:
    receiving a set of input pixel values from an M-channel codec, each input pixel comprising M input subpixel arranged in the M-channel format;
    rearranging each of the input subpixel values into a set of output pixel values, each set of output pixel values comprising O output subpixel values arranged in an O-channel format, O having a greater value than M, wherein at least a portion of the rearranged O output subpixels maintain their relative spatial positioning from prior to being rearranged from the M input subpixel values, wherein the M-channel format includes M different color channels and wherein the O-channel format includes the M color channels and at least one additional color channel, and wherein rearranging each of the input subpixel values into a set of output pixel values comprises:

arranging a plurality of the input subpixel values of the M color channels in the corresponding O color channels of the output pixel values, arranging each of the input subpixel values which correspond to the at least one additional color channel into output pixel values of the at least one additional color channel, buffering each of the input subpixel values which correspond to the M color channels in a first buffer, buffering each of the input subpixel values which correspond to the at least one additional color channel in a second buffer, and selecting M pixels from the first buffer and at least one pixel from the second buffer to construct the output pixel values; and providing the output pixel values as an output.

14. The method of claim 13, wherein the first and second buffers are first in first out (FIFO) buffers.

15. The method of claim 13, wherein the subpixels of the at least one additional color channel are arranged in column-major order in the N input pixel values.

16. The method of claim 13, wherein the subpixels of the at least one additional color channel are arranged in row-major order in the N input pixel values.

17. The method of claim 13, further comprising:
selecting, via a state machine, which of the first and second buffers to place each of the input subpixel values.

18. The method of claim 13, further comprising:
providing the output pixel values at a rate that is less than the rate at which the set of input pixel values are received.

19. A device for unpacking pixel values arranged in an M-channel format, comprising:

a transceiver circuit comprising M input channels configured to respectively receive M input subpixel values of an input pixel value arranged in the M-channel format;

at least one buffer configured to buffer the M input subpixels; and a logic circuit configured to rearrange the M input subpixels into a set of output pixel values, each output pixel value comprising O output subpixel values arranged in an O-channel format, O having a greater value than M, wherein at least a portion of the rearranged O output subpixels maintain their relative spatial positioning from prior to being rearranged from the M input subpixel values, wherein the M-channel format includes M different color channels and wherein the O-channel format includes the M color channels and at least one additional color channel, and wherein to rearrange each of the input subpixel values into a set of output pixel values, the logic circuit is further configured to:

arrange a plurality of the input subpixel values of the M color channels in the corresponding O color channels of the output pixel values, arrange each of the input subpixel values which correspond to the at least one additional color channel into output pixel values of the at least one additional color channel, buffer each of the input subpixel values which correspond to the M color channels in a first buffer of the at least one buffer, buffer each of the input subpixel values which correspond to the at least one additional color channel in a second buffer of the at least one buffer, and select M pixels from the first buffer and at least one pixel from the second buffer to construct the output pixel values;

wherein the transceiver circuit further comprises O output channels configured to output the set of output pixel values.

20. The device of claim 19, wherein the first and second buffers are first in first out (FIFO) buffers.

21. The device of claim 19, wherein the subpixels of the at least one additional color channel are arranged in column-major order in the N input pixel values.

22. The device of claim 19, wherein the subpixels of the at least one additional color channel are arranged in row-major order in the N input pixel values.

* * * * *